United States Patent Office 3,472,819
Patented Oct. 14, 1969

3,472,819
POLYAMIDES OF THE RECURRING BENZAMIDE UNIT
Curtis Wayne Stephens, Wilmington, Del., assignor to E. I. du Pont de Nemours and Company, Wilmington, Del., a corporation of Delaware
No Drawing. Continuation-in-part of application Ser. No. 444,032, Mar. 30, 1965, which is a continuation-in-part of application Ser. No. 32,565, May 31, 1960. This application Apr. 3, 1967, Ser. No. 627,657
Int. Cl. C08g 20/04
U.S. Cl. 260—78        4 Claims

ABSTRACT OF THE DISCLOSURE

A polyamide (including copolymers) of the formula

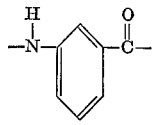

Said polyamide is especially useful in the form of textile fibers and films where resistance to high temperature is desired.

RELATED APPLICATIONS

This application is a continuation-in-part of U.S. Ser. No. 444,032 filed Mar. 30, 1965, now abandoned, which in turn is a continuation-in-part of U.S. Ser. No. 32,565 filed May 31, 1960, now abandoned.

BACKGROUND OF THE INVENTION

The invention relates to a novel and useful polymer and to fibers of exceptional thermal characteristics formed therefrom.

SUMMARY OF THE INVENTION

In accordance with the present invention a synthetic, linear polyamide is provided consisting essentially of recurring units of the formula:

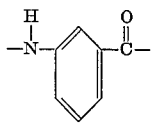

For fiber formation, it is preferable that polymer have an inherent viscosity of at least about 0.7, preferably about 1.3. Fibers prepared from this polymer are stable for several weeks at a temperature of 300° C. and for at least 1 hour at 400° C. Even at 500° C., the fibers retain strength for at least 60 seconds, which is usually longer than conventional ironing exposure. The zero-strength temperature (i.e., the temperature at which fibers fail to support a load of 0.1 gram per denier) of fibers of this polymer is between about 480° and about 550° C. By the expression "consisting essentially of" is intended that the repeating unit as identified above constitute at least about 85% and preferably 90% of the polymer of the present invention.

The novel polyamide of this invention can be prepared directly by polymerizing its intermediate, m-aminobenzoyl chloride hydrochloride, at a temperature between about −20° C. and about 60° C. in a suitable organic solvent such as dimethylacetamide. While dimethylacetamide is a preferred polymerization medium for the reactions leading to the polymer of this invention, other liquid reaction media such as hexamethylphosphoramide or N-methyl-2-pyrrolidone used alone or with small amounts of lithium chloride, lithium bromide, calcium chloride, calcium bromide or other chloride or bromide salts are also suitable. In addition, while it is convenient and desirable to prepare the polymer by employing a single organic solvent as a low temperature polymerization medium, it is also possible to employ miscible mixed solvents wherein the monomeric material is present in one phase, such as an organic phase typified by tetrahydrofuran, while a second phase, preferably aqueous and miscible with the organic phase contains an inorganic or organic acid acceptor suitable for initiating and causing continuity of the polymerization reaction.

In the preparation of fibers from the polyamide of this invention, a spinning solution from which fibers may be dry spun, is prepared by dissolving the polyamide in dimethylacetamide containing from about 5 to 7% by weight of lithium chloride. Other spinning solvents such as hexamethylphosphoramide or N-methyl-2-pyrrolidone may also be used. In preferred spinning solutions, at least 13% and as much as 25% by weight of polymer can be present in the solution.

The term "inherent viscosity" as used herein, is defined by the following formula:

$$\eta_{\text{inh}} = \frac{\ln \eta R}{c}$$

The relative viscosity ($\eta R$) is determined by dividing the flow time in a capillary viscometer of a dilute solution of the polymer by the flow time for the pure solvent. The concentration (c.) is 0.5 gram of polymer per 100 ml. of solution and the measurements are made at a temperature of 30° C.

THE EXAMPLES

Example 1

The polyamide intermediate, m-aminobenzoyl chloride hydrochloride, is prepared by refluxing m-aminobenzoic acid in thionyl chloride for 12 hours, distilling off the product of this reaction, m-thionylaminobenzoyl chloride, collecting it, and treating it in dry benzene with hydrogen chloride. The m-aminobenzoyl chloride hydrochloride obtained is removed by filtration, washed with dry benzene, and dried overnight in a vacuum oven under nitrogen at room temperature.

A three-necked flask equipped with a stirrer is placed in a Dry Ice-acetone cooling bath at −25 to −30° C. 471.5 parts of dimethylacetamide is added and, when this has cooled, 140 parts of m-aminobenzoyl chloride hydrochloride. The mixture is allowed to warm up to room temperature, stirred for about 5 hours at room temperature, and then treated with water in an "Osterizer" blender (in portions) to precipitate the polymer. After being washed three times with water in the "Osterizer," the polymer is washed with acetone on a Buchner funnel and then ground in a Wiley mill to pass a 20-mesh screen. It has an inherent viscosity in sulfuric acid of 1.25.

The polymer is dissolved in dimethylacetamide containing 6.4% lithium chloride to give a 19.8% solution of polymer. The solution is heated to 130° C. and dry spun through a 5-hole spinneret into air at 210° C. The yarn is wound up at 420 feet per minute and is then extracted overnight in cold water.

A portion of the yarn is drawn to 5 times its original length (in an atmosphere of 40 p.s.i. steam) and then stretched 10% over a plate at 345° C. It is then boiled off relaxed. It has a tenacity of 5.8 g.p.d. (grams per denier), an elongation of 10%, and an initial modulus of 118 g.p.d. Another sample is heated to 300° C. and tested at that temperature. It has a tenacity of 3 g.p.d. an elongation of 7.5%, and an initial modulus of 89 g.p.d.

A second portion of the spun, cold-water extracted yarn is then extracted with hot water (95° C.) for one hour, dried, and then pin drawn at 315° C. to 5.9 times its original length. It is then stretched 5% over a plate at 330° C. After boil-off (relaxed), the yarn has a tenacity of 5.7 g.p.d., an elongation of 14% and an initial modulus of 120 g.p.d. A sample of the yarn is then exposed on a bobbin for a period of five weeks in air at 300° C., after which the yarn is removed and tested. It has a tenacity of 3.5 g.p.d., an elongation of 4% and an initial modulus of 130 g.p.d.

Example 2

The polyamide intermediate, m-aminobenzoyl chloride hydrochloride, is prepared by refluxing m-aminobenzoic acid in thionyl chloride for 4 hours. The product of this reaction is distilled off, collected, dissolved in benzene and treated with dry hydrogen chloride at 25° C. for about 3 hours to give the polyamide intermediate.

A three-necked flask equipped with a stirrer is placed in a Dry Ice-acetone cooling bath at —20° C. There is added to the flask, 660 parts of dimethylacetamide and 213.9 parts of m-aminobenzoyl chloride hydrochloride. The mixture is kept under an atmosphere of nitrogen during the reaction. The viscous mixture is left without further cooling for 60 hours. At the end of this time, the resulting stiff gelled solution is treated with water in an "Osterizer" blender to precipitate the polymer. After washing twice with water, the polymer is then washed with acetone on a Buchner funnel. The polymer so obtained (in 100% yield) is colorless and has an inherent viscosity of 1.37 in sulfuric acid at 30° C.

Example 3

In an experiment employing apparatus similar to that described above, a slurry of 600 parts of tetrahydrofuran containing 200 parts of meta-aminobenzoyl chloride hydochloride is prepared. This slurry is mixed with an aqueous solution of sodium carbonate in a Waring Blendor for two minutes during which time the polymerization reaction goes substantially to completion. At the end of this time the polymer is filtered off, washed and dried. There is obtained a polymer with an inherent viscosity of 0.7 measured in sulfuric acid. The polymer is dissolved to give a 25% solution in dimethylacetamide containing lithium chloride. This spinning solution is employed to prepare a five-filament yarn similar to that already described. The yarn is drawn at 5× and yields drawn continuous filament yarn with a tenacity of 3.2 g.p.d. and an elongated of 15%.

While the above examples show the preparation of spinning solutions by dissolving the solid polymer, it is also possible to obtain a spinning solution directly from the reaction medium by omitting the precipitating steps of the first example. In addition to spinning the polymer of this invention into continuous filaments, it is also possible, and at times desirable, to prepare the polymer in the form of fibrids according to the shear precipitation techniques described in Belgian Patent 564,206. In employing shear precipitation, it is possible to start either with a solution prepared directly from the polymerization reaction or else to form the polymer, isolate it, wash it, dry it and redissolve it to give a solution of any desired polymer concentration. By preparing fibrids of this polymer composition, it is possible to obtain non-woven, paper-like or fabric-like sheets having outstanding resistance to high temperature exposure.

The novel polyamides of this invention offer many advantages in addition to the outstanding thermal characteristics of fibers prepared therefrom. Since only a single intermediate is used, there is no problem in maintaining a balance of reactants or in wasting one reactant by adding an excess. Furthermore, the polyamide obtained is a colorless material, even without special purification of the intermediate and both the polymer and fibers therefrom retain good color even after long exposure at temperatures in excess of 300° C.

The polyamide of the present invention can be defined by the formula

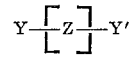

wherein Y and Y' are the same or different end groups and —Z— is a polymer made up of repeating units at least about 85% and preferably 90% are of the formula

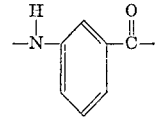

copolymeric units when present preferably being a member of the class consisting of polyamide and polyurethane. The end groups Y and Y' constitute a very minor proportion of the molecule and their nature is not important. In terminating the reaction the amine end can react with proton acceptors and the acid chloride end can react with proton donors. In both cases the elements of HCl are eliminated in the process described herein.

As will be apparent to those skilled in the art, whenever either end reacts with something other than the bifunctional monomer, a chain stoppered end results. This end is no longer capable of growing. When both ends have so reacted, the molecule is completely removed from the polymerization process. Polymerization will proceed until one type of group has become used up.

The polymer end groups will originally be amine (i.e., hydrogen attached to the amino nitrogen) and acid chloride (i.e., chlorine attached to the carbonyl radical). Further reaction of the acid chloride and/or amine ends can occur with chain terminating reagents added to or already in the system system during polymerization or after-treatment (e.g., during washing of the polymer) whereby the ultimate end groups of the polymer will be dependent on the particular chain terminator present, as is well known in the polymer art.

As stated above, the chain terminators may be present in the system. Water present, for example, in the dimethylacetamide or tetrahydrofuran solvent and/or in the washing step is an effective chain terminator, converting the acid chloride ends of the polymer to carboxyl ends (i.e., —OH attached to the carbonyl radical). Dimethylamine present in the dimethylacetamide solvent can react with the acid chloride ends of the polymer, converting them to dimethylamide ends (i.e., —N(CH$_3$)$_2$ attached to the carbonyl radical). Hydroquinone present in the tetrahydrofuran solvent can react with the acid chloride ends of the polymer yielding a terminal

(p-hydroxyphenoxy) attached to the carbonyl.

It desired, the chain terminators may be specifically added to the system to terminate polymerization at some desired point. Among the additional suitable chain terminators are monofunctional compounds which can react with the acid chloride ends of the polymer, such as ammonia, monoamines (e.g., methylamine, dimethylamine, ethylamine, butylamine, dibutylamine, cyclohexylamine, aniline, etc.), compounds containing a single amide-forming amino group, such as N,N-diethylethylenediamine: (C$_2$H$_5$)$_2$NCH$_2$CH$_2$NH$_2$, or alcohols (e.g., methyl alcohol, ethyl alcohol, isopropyl alcohol, phenol, etc.) and monofunctional compounds which can react with the amine ends of the polymer such as acid chlorides (e.g., acetyl chloride, benzoyl chloride, etc.) or acid anhydrides (e.g., acetic anhydride, phthalic anhydride, etc.)

Any of the additives, fillers, pigments, finishers, and the like, which are conventionally added to polyamide compositions, may be added to this polyamide without seriously detracting from the outstanding physical characteristics obtained.

Minor amounts of any fiber-forming polymer may be blended with the polyamide of the present invention by melt or solution blending techniques. Among these suitable polymers are included polyamides, such as poly(hexamethylene adipamide); polyesters, such as poly(ethylene terephthalate); polyacrylonitriles containing at least about 85% combined acrylonitrile, such as polyacrylonitrile and the copolymer of acrylonitrile (92.0), methyl acrylate (7.5) and sodium styrene sulfonate (0.5); polyhydrocarbons, such as polyethylene and polypropylene, and the like. Additional specific examples of polymers which can be satisfactorily blended with the polyamide composition of this invention are disclosed in U.S. Patent 2,245,129 and 2,625,536.

Among the suitable copolymerizable monomers there are included the hydrochloride salts of para-amino benzoyl chloride, the chloroformate ester of 4-hydroxypiperidine, ε-amino caproyl chloride, and similar materials.

In fiber form, the polymers of this invention may be used for high temperature heat and electrical insulation, protective clothing and curtains, filtration media, packing and gasketing materials, brake linings and clutch facings. In the aircraft industry, these materials can be used in parachutes, fuel cells, tires, ducts, hoses and insulation. Cordage for tires and conveyor belts, particularly where such materials would be subject to prolonged high temperature exposure is another application. Press cloths in the dry cleaning industry prepared from such fibers have extreme hydrolytic stability. In the form of films, these polymers may be used in automotive and aviation interior head lining materials, decorative trim, high temperature heat and electrical insulation, such as for slot liners, use in dry transformers, capacitors, cable wrappings, etc., packaging of items to be exposed to high temperature or high energy radiation while within the package, corrosion resistant pipe, hot water pipe, duct work, hot air ventilation, aircraft body skins, aircraft radomes, embossing roll covers, containers and container linings, printed circuits, tape for hot pipe overwrapping, laminated structures where the films are bonded to metal sheets of foils, mold liners or self-sustaining containers for casting low-melting (below 300° C.) fusible materials, including metals, and a variety of other similar and related uses. Valuable flexible materials similar in funtion to putty with outstanding high temperature stability can be made by combining fibers prepared from polymers of the present invention with flexible high temperature polymers such as plasticized chlorotrifluoroethylene polymers.

Because they retain fiber properties at elevated temperatures, fibers from the polymers of this invention can be used in high temperature applications along with heat-resistant resins and elastomers, such as polytetrafluoroethylene, fluoro-rubbers, and silicone resins. Fabrics from these fibers form a base material to which resins can be applied as a coating or impregnant; also staple fibers can be mixed into a matrix of the resin to give a reinforced plastic material.

Solutions of polymers of this invention are valuable as varnishes, adhesives, wire-coatings, fabric-coatings, and similar products. Fabrics suitable as a substrate for the coatings of this invention include woven and non-woven fabrics made from fibers of glass, asbestos, poly(ethylene terephthalate), polyacrylonitrile, poly(hexamethylene adipamide), and other nylons, cotton, wool, polytetrafluoroethylene and mixtures thereof. When applied to wood, metal, and ceramics, these solutions form strong, heat-resistant films which can withstand repeated flexing, hammer-blows and chemical attack.

Many equivalent modifications will become apparent to those skilled in the art from a reading of the above without a departure from the inventive concept.

What is claimed is:

1. A fiber-forming synthetic linear polyamide consisting of recurring units of the formula:

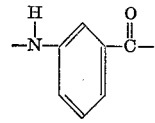

said polyamide having an inherent viscosity of at least about 1.3 when measured in sulfuric acid at a concentration of 0.5 gram of polymer per 100 ml. of acid and at a temperature of 30° C.

2. A fiber-forming synthetic linear polymer consisting essentially of recurring units of the formula

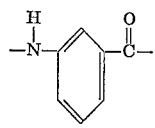

said polymer having an inherent viscosity of at least about 0.7 when measured in sulfuric acid at a concentration of 0.5 gram of polymer per 100 ml. of acid and at a temperature of 30° C.

3. A textile fibers of the polymer of claim 2.
4. A film of the polymer of claim 2.

References Cited

UNITED STATES PATENTS

| | | | |
|---|---|---|---|
| 2,356,516 | 8/1944 | Hagedorn | 260—78 |
| 2,688,011 | 8/1954 | Wheatley et al. | 260—78 |
| 3,012,994 | 12/1961 | Bell et al. | 260—78 |
| 3,079,219 | 2/1963 | King | 260—78 |
| 3,109,836 | 11/1963 | Berry | 260—78 |
| 3,203,933 | 8/1965 | Hoffman et al. | 260—78 |
| 3,225,011 | 12/1965 | Preston et al. | 260—78 |

OTHER REFERENCES

Carre et al.: Compt. Rend. Seánce Acad. Soc., 201 (1935), pp. 147–149.

Graf et al.: Journal für Praktische Chemie (7–8), 148 (1937), pp. 161–169.

HAROLD D. ANDERSON, Primary Examiner

U.S. Cl. X.R.

117—161, 152—330; 161—227; 260—30.6, 30.2, 30.8, 32.6, 47, 824, 857; 264—210